(12) United States Patent
Gupta et al.

(10) Patent No.: US 12,001,491 B2
(45) Date of Patent: Jun. 4, 2024

(54) METHOD AND SYSTEM FOR AUTOMATED PUBLIC INFORMATION DISCOVERY

(71) Applicant: JPMorgan Chase Bank, N.A., New York, NY (US)

(72) Inventors: Akshat Gupta, New York, NY (US); Simerjot Kaur, Jersey City, NJ (US); Xiaomo Liu, Manhasset, NY (US); Armineh Nourbakhsh, Pittsburgh, PA (US); Andrea Stefanucci, Hoboken, NJ (US); Alex Woodgate, New York, NY (US); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 25 days.

(21) Appl. No.: 17/649,617

(22) Filed: Feb. 1, 2022

(65) Prior Publication Data

US 2023/0244724 A1 Aug. 3, 2023

(51) Int. Cl.
*G06F 16/951* (2019.01)
*G06F 16/957* (2019.01)

(52) U.S. Cl.
CPC .......... *G06F 16/951* (2019.01); *G06F 16/957* (2019.01)

(58) Field of Classification Search
CPC .............................. G06F 16/951; G06F 16/957
USPC ...................................................... 707/609
See application file for complete search history.

(56) References Cited

U.S. PATENT DOCUMENTS

| 5,983,170 A * | 11/1999 | Goodman | G06F 40/30 704/9 |
| 2002/0198824 A1* | 12/2002 | Cook | G06Q 40/03 705/38 |
| 2003/0018487 A1* | 1/2003 | Young | G06Q 30/0283 705/14.1 |
| 2008/0222734 A1* | 9/2008 | Redlich | H04L 9/3271 726/26 |
| 2010/0030578 A1* | 2/2010 | Siddique | H04W 4/00 705/26.1 |
| 2014/0279622 A1* | 9/2014 | Lamoureux | G06Q 50/01 705/319 |
| 2022/0245188 A1* | 8/2022 | Kappel | G06N 3/08 |

* cited by examiner

*Primary Examiner* — Kuen S Lu
(74) *Attorney, Agent, or Firm* — GREENBLUM & BERNSTEIN, P.L.C.

(57) ABSTRACT

A method for using an artificial intelligence-based framework to automatically discover and extract information about private and public companies that is accessible from public data sources is provided. The method includes: receiving first information that relates to an identification of a company; determining, based on the first information, publicly accessible data sources via which second information that relates to the company is available; receiving user input that relates to a type of company-specific data to be accessed from the data sources; retrieving, based on the received user input, a subset of the second information; and outputting the subset of the second information. The second information may include leadership profiles, information about products and services, a company description, and/or information about corporate policies.

20 Claims, 8 Drawing Sheets

METHOD AND SYSTEM FOR AUTOMATED PUBLIC INFORMATION DISCOVERY

BACKGROUND

1. Field of the Disclosure

This technology generally relates to methods and systems for obtaining publicly available information about commercial entities, and more particularly to methods and systems for using an artificial intelligence-based framework to automatically discover and extract information about private and public companies that is accessible from public data sources.

2. Background Information

In a large financial institution such as a bank, many business teams may rely on various types of company-based data, such as leadership team profiles, products and services, and environmental, social, and governance (ESG) policies in order to make key business decisions and services. However, many of these types of data and information may not be complete or may even not exist in the bank's databases. Such information is often publicly available from heterogeneous data sources such as company websites, annual reports, regulatory filings, news and social media. However, there are huge challenges for collecting these data manually on a large scale that may approach millions of companies. As the number of start-ups continues to grow, the problem requirement of needing complete autonomous tools to identify and extract relevant public information on these start-ups has become apparent.

More specifically, the problem at hand is that there are a large number of start-up companies, including private and public companies, and identifying and extracting relevant public information on these companies is a tedious task involving a significant amount of manual labor, with a high probability of missing various companies and also the risk that much relevant information will be missed. Further, since there are many public data sources, each being associated with their own caveats, finding and extracting relevant information in an autonomous manner becomes a difficult problem to solve.

Accordingly, there is a need for a mechanism to use an artificial intelligence-based framework to automatically discover and extract information about private and public companies that is accessible from public data sources.

SUMMARY

The present disclosure, through one or more of its various aspects, embodiments, and/or specific features or sub-components, provides, inter alia, various systems, servers, devices, methods, media, programs, and platforms for using an artificial intelligence-based framework to automatically discover and extract information about private and public companies that is accessible from public data sources.

According to an aspect of the present disclosure, a method for extracting company-specific publicly accessible information is provided. The method is implemented by at least one processor. The method includes: receiving, by the at least one processor, first information that relates to an identification of at least one company; determining, by the at least one processor based on the first information, at least one publicly accessible data source via which second information that relates to the at least one company is available; receiving, by the at least one processor, at least one user input that relates to a type of company-specific data to be accessed from the at least one publicly accessible data source; retrieving, by the at least one processor based on the received at least one user input, a subset of the second information; and outputting, by the at least one processor, the subset of the second information.

The second information may include at least one from among profile information that relates to at least one person that is associated with the at least one company, product information that relates to at least one product that is associated with the at least one company, service information that relates to at least one service that is provided by the at least one company, descriptive information that relates to a description of the at least one company, employee number information that relates to a number of employees associated with the at least one company, and policy information that relates to at least one corporate policy that is associated with the at least one company.

The policy information may include at least one environmental, social, and governance (ESG) policy that is associated with the at least one company.

The at least one user input that relates to a type of company-specific data may include at least one from among a first data type that relates to a company site, a second data type that relates to a company description, a third data type that relates to a company leadership, a fourth data type that relates to a product associated with the company, a fifth data type that relates to a service provided by the company, a sixth data type that relates to an asset under management associated with the company, a seventh data type that relates to an environmental, social, and governance (ESG) policy associated with the company, and an eighth data type that relates to an annual report associated with the company.

The method may further include displaying an input screen of a graphical user interface that includes at least one prompt for facilitating at least one from among the receiving of the first information and the receiving of the at least one user input.

The method may further include displaying an output screen of the graphical user interface that includes a result of the outputting of the subset of the second information.

The determining of the at least one publicly accessible data source may include extracting at least one from among a company name and a company website from the first information.

The determining of the at least one publicly available data source may further include performing a web search based on the at least one from among the company name and the company website and at least one predetermined keyword.

The determining of the at least one publicly available data source may further include performing a recursive web crawling operation within the company website and at least one web page that links to the company website.

The determining of the at least one publicly available data source may further include performing a topic-based web crawling operation within a domain to identify at least one web page that contains the at least one predetermined keyword and to provide a ranking of each of the identified at least one web page.

The retrieving of the subset of the second information may include using an artificial intelligence (AI)—based algorithm to extract the subset of the second information from the at least one publicly accessible data source based on the at least one user input.

The AI-based algorithm may include a document object model (DOM) tree-based data identification and extraction algorithm that is configured to identify at least one Hyper- Text Markup Language (HTML) tag that contains a link to a news article that includes at least a portion of the second information.

According to another aspect of the present disclosure, a computing apparatus for extracting company-specific publicly accessible information is provided. The computing apparatus includes a processor; a memory; a display; and a communication interface coupled to each of the processor, the memory, and the display. The processor is configured to: receive, via the communication interface, first information that relates to an identification of at least one company; determine, based on the first information, at least one publicly accessible data source via which second information that relates to the at least one company is available; receive, via the communication interface, at least one user input that relates to a type of company-specific data to be accessed from the at least one publicly accessible data source; retrieve, based on the received at least one user input, a subset of the second information; and output the subset of the second information.

The second information may include at least one from among profile information that relates to at least one person that is associated with the at least one company, product information that relates to at least one product that is associated with the at least one company, service information that relates to at least one service that is provided by the at least one company, descriptive information that relates to a description of the at least one company, employee number information that relates to a number of employees associated with the at least one company, and policy information that relates to at least one corporate policy that is associated with the at least one company.

The policy information may include at least one environmental, social, and governance (ESG) policy that is associated with the at least one company.

The at least one user input that relates to a type of company-specific data may include at least one from among a first data type that relates to a company site, a second data type that relates to a company description, a third data type that relates to a company leadership, a fourth data type that relates to a product associated with the company, a fifth data type that relates to a service provided by the company, a sixth data type that relates to an asset under management associated with the company, a seventh data type that relates to an environmental, social, and governance (ESG) policy associated with the company, and an eighth data type that relates to an annual report associated with the company.

The processor may be further configured to cause the display to display an input screen of a graphical user interface that includes at least one prompt for facilitating at least one from among the receiving of the first information and the receiving of the at least one user input.

The processor may be further configured to cause the display to display an output screen of the graphical user interface that includes a result of the outputting of the subset of the second information.

The processor may be further configured to determine the at least one publicly accessible data source by extracting at least one from among a company name and a company website from the first information.

The processor may be further configured to determine the at least one publicly accessible data source by performing a web search based on the at least one from among the company name and the company website and at least one predetermined keyword.

The processor may be further configured to retrieve the subset of the second information by using an artificial intelligence (AI)—based algorithm to extract the subset of the second information from the at least one publicly accessible data source based on the at least one user input.

According to yet another aspect of the present disclosure, a non-transitory computer readable storage medium storing instructions for extracting company-specific publicly accessible information is provided. The storage medium includes executable code which, when executed by a processor, causes the processor to: receive first information that relates to an identification of at least one company; determine, based on the first information, at least one publicly accessible data source via which second information that relates to the at least one company is available; receive at least one user input that relates to a type of company-specific data to be accessed from the at least one publicly accessible data source; retrieve, based on the received at least one user input, a subset of the second information; and output the subset of the second information.

The second information may include at least one from among profile information that relates to at least one person that is associated with the at least one company, product information that relates to at least one product that is associated with the at least one company, service information that relates to at least one service that is provided by the at least one company, descriptive information that relates to a description of the at least one company, employee number information that relates to a number of employees associated with the at least one company, and policy information that relates to at least one corporate policy that is associated with the at least one company.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
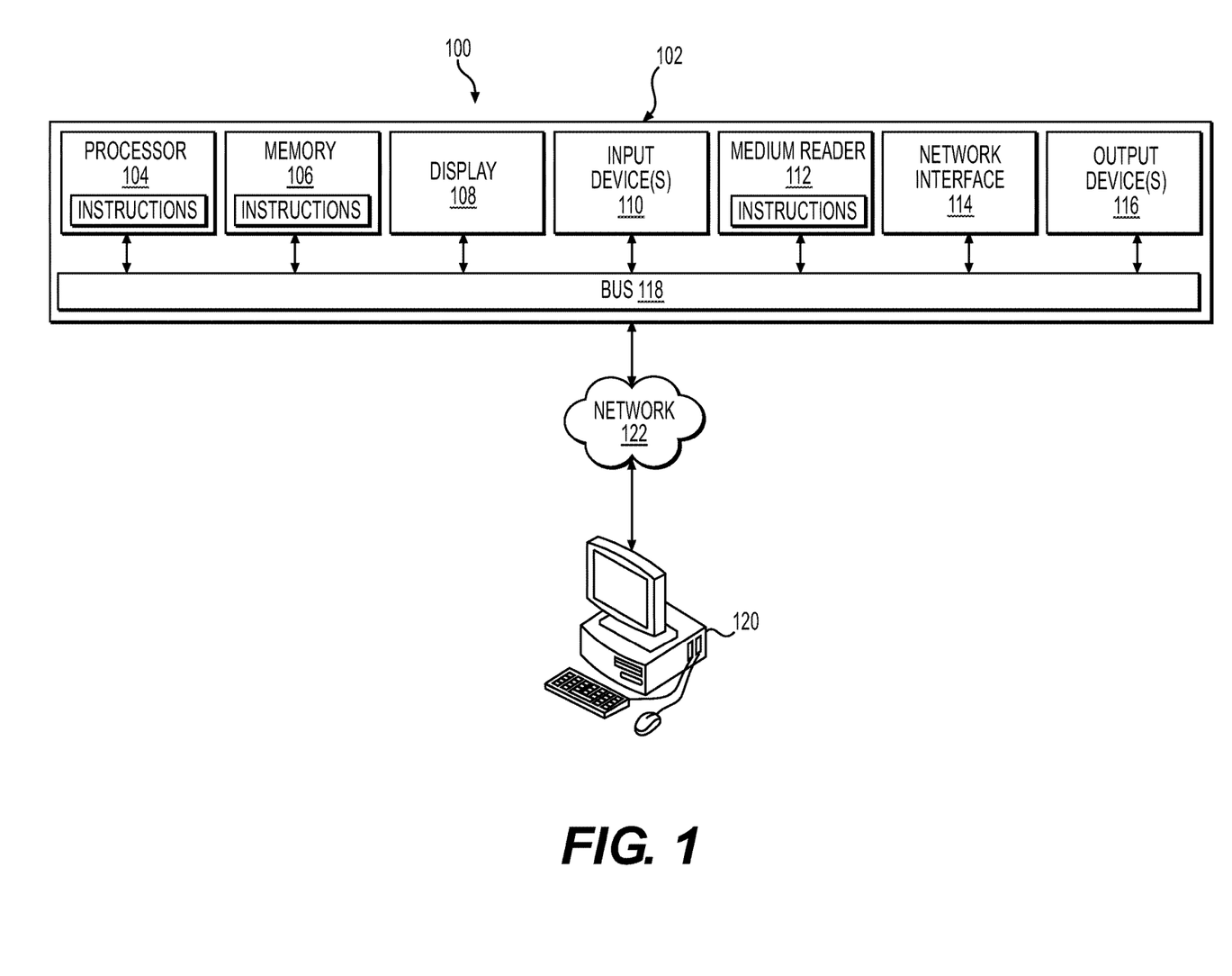
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using an artificial intelligence-based framework to automatically discover and extract information about private and public companies that is accessible from public data sources.

Figure 2:
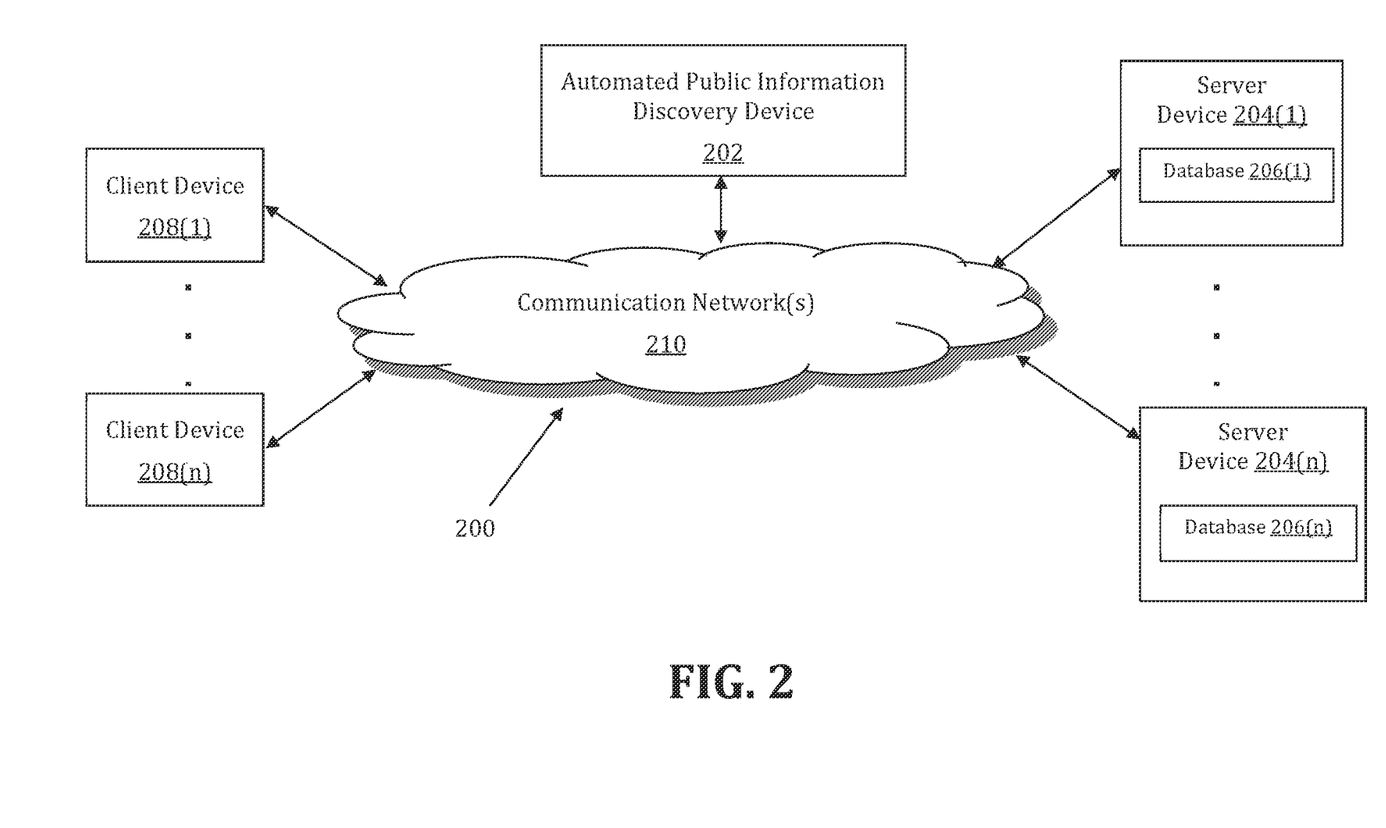
FIG. 2 illustrates an exemplary diagram of a network environment.

Referring to FIG. 2, a schematic of an exemplary network environment 200 for implementing a method for using an artificial intelligence-based framework to automatically discover and extract information about private and public companies that is accessible from public data sources is illustrated. In an exemplary embodiment, the method is executable on any networked computer platform, such as, for example, a personal computer (PC).

The method for using an artificial intelligence-based framework to automatically discover and extract information about private and public companies that is accessible from public data sources may be implemented by an Automated Public Information Discovery (APID) device 202. The APID device 202 may be the same or similar to the computer system 102 as described with respect to FIG. 1. The APID device 202 may store one or more applications that can include executable instructions that, when executed by the APID device 202, cause the APID device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the APID device 202 itself, may be located in virtual server(s) running in a cloud-based computing environment rather than being tied to one or more specific physical network computing devices. Also, the application(s) may be running in one or more virtual machines (VMs) executing on the APID device 202. Additionally, in one or more embodiments of this technology, virtual machine(s) running on the APID device 202 may be managed or supervised by a hypervisor.

In the network environment 200 of FIG. 2, the APID device 202 is coupled to a plurality of server devices 204(1)-204(n) that hosts a plurality of databases 206(1)-206 (n), and also to a plurality of client devices 208(1)-208(n) via communication network(s) 210. A communication interface of the APID device 202, such as the network interface 114 of the computer system 102 of FIG. 1, operatively couples and communicates between the APID device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the APID device 202, the server devices 204 (1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and APID devices that efficiently implement a method for using an artificial intelligence-based framework to automatically discover and extract information about private and public companies that is accessible from public data sources.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The APID device 202 may be a standalone device or integrated with one or more other devices or apparatuses, such as one or more of the server devices 204(1)-204(n), for example. In one particular example, the APID device 202 may include or be hosted by one of the server devices 204(1)-204(n), and other arrangements are also possible. Moreover, one or more of the devices of the APID device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the APID device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store data that relates to company-specific information and data that relates to publicly accessible sources.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the APID device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the APID device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the APID device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the APID device 202, the server devices 204(1)-204(n), or the client devices 208(1)-208(n), for example, may be configured to operate as virtual instances on the same physical machine. In other words, one or more of the APID device 202, the server devices 204(1)-204(n), or the client devices 208(1)-208(n) may operate on the same physical device rather than as separate devices communicating through communication network(s) 210. Additionally, there may be more or fewer APID devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
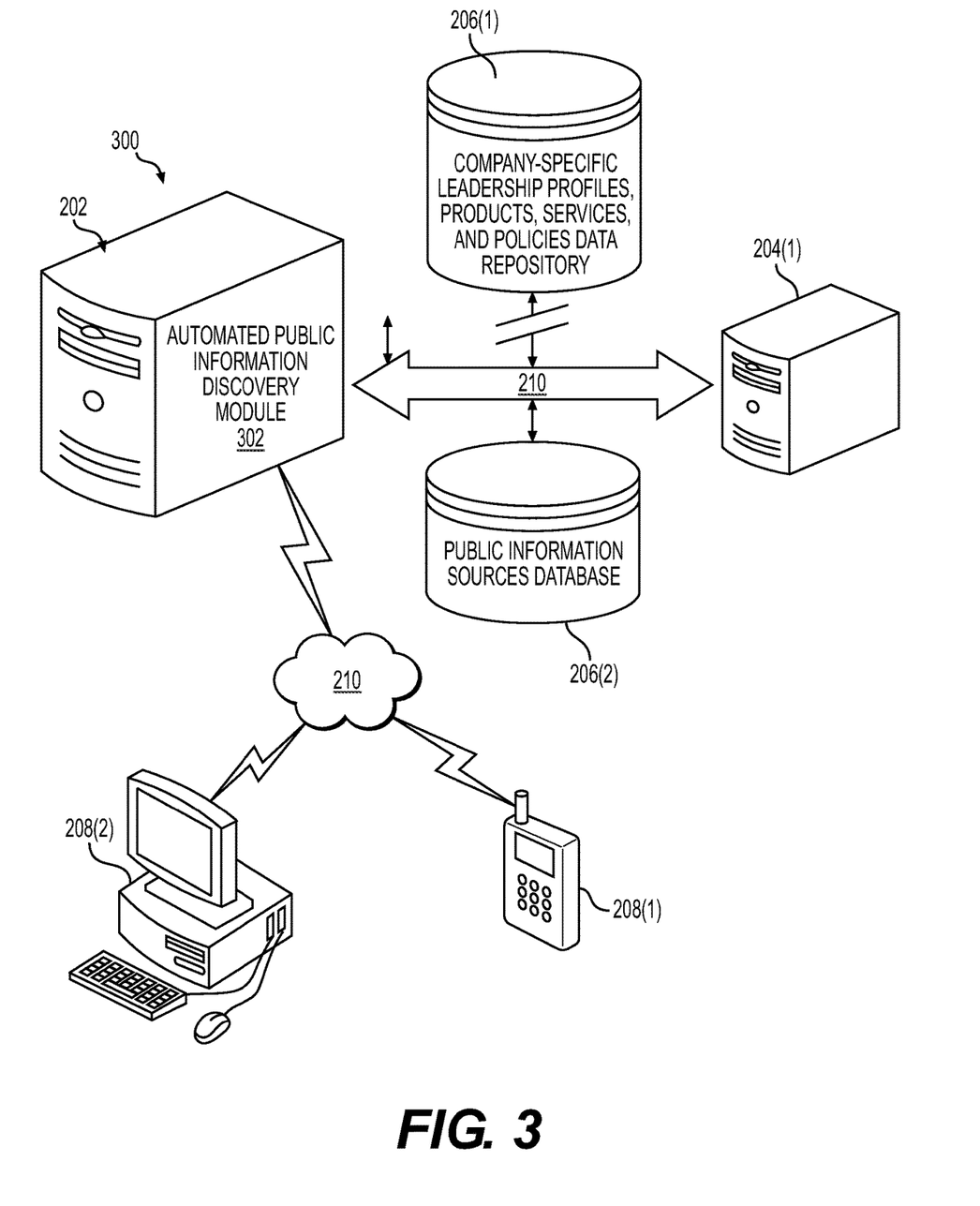
FIG. 3 shows an exemplary system for implementing a method for using an artificial intelligence-based framework to automatically discover and extract information about private and public companies that is accessible from public data sources.

The APID device 202 is described and illustrated in FIG. 3 as including an automated public information discovery module 302, although it may include other rules, policies, modules, databases, or applications, for example. As will be described below, the automated public information discovery module 302 is configured to implement a method for using an artificial intelligence-based framework to automatically discover and extract information about private and public companies that is accessible from public data sources.

An exemplary process 300 for implementing a mechanism for using an artificial intelligence-based framework to automatically discover and extract information about private and public companies that is accessible from public data sources by utilizing the network environment of FIG. 2 is illustrated as being executed in FIG. 3. Specifically, a first client device 208(1) and a second client device 208(2) are illustrated as being in communication with APID device 202. In this regard, the first client device 208(1) and the second client device 208(2) may be "clients" of the APID device 202 and are described herein as such. Nevertheless, it is to be known and understood that the first client device 208(1) and/or the second client device 208(2) need not necessarily be "clients" of the APID device 202, or any entity described in association therewith herein. Any additional or alternative relationship may exist between either or both of the first client device 208(1) and the second client device 208(2) and the APID device 202, or no relationship may exist.

Further, APID device 202 is illustrated as being able to access a company-specific leadership profiles, products, services, and policies data repository 206(1) and a public information sources database 206(2). The automated public information discovery module 302 may be configured to access these databases for implementing a method for using an artificial intelligence-based framework to automatically discover and extract information about private and public companies that is accessible from public data sources.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the APID device 202 via broadband or cellular communication. Of course, these embodiments are merely exemplary and are not limiting or exhaustive.

Upon being started, the automated public information discovery module 302 executes a process for using an artificial intelligence-based framework to automatically discover and extract information about private and public companies that is accessible from public data sources. An exemplary process for using an artificial intelligence-based framework to automatically discover and extract information about private and public companies that is accessible from public data sources is generally indicated at flowchart 400 in FIG. 4.

Figure 4:
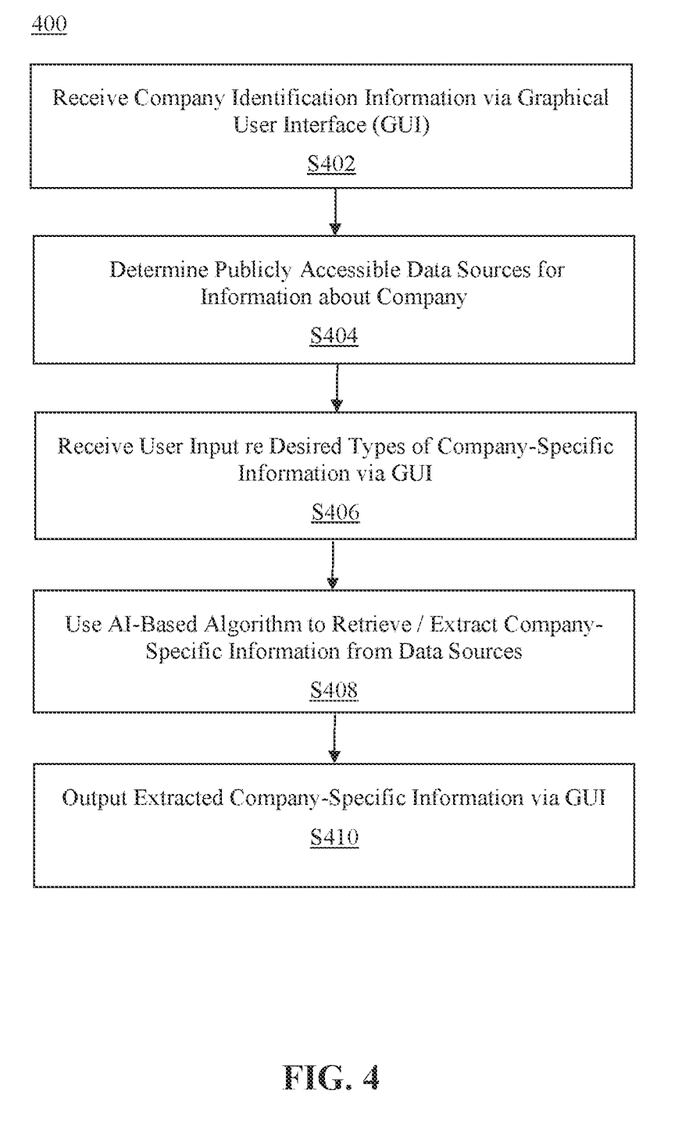
FIG. 4 is a flowchart of an exemplary process for implementing a method for using an artificial intelligence-based framework to automatically discover and extract information about private and public companies that is accessible from public data sources.

In process 400 of FIG. 4, at step S402, the automated public information discovery module 302 receives first information that relates to an identification of at least one company, such as, for example, a list of company names and/or web sites that are associated with companies. In an exemplary embodiment, the first information may be received via a graphical user interface (GUI) that displays an input screen that includes prompts for facilitating user inputs of company identifiers, such as, for example, an input file that includes a list of company names and their respective web sites.

At step S404, the automated public information discovery module 302 determines a set of publicly accessible data sources via which company-specific second information about the companies identified in the first information is available. In an exemplary embodiment, the publicly accessible data sources may include any one or more of the company web sites, annual reports that have been submitted by the companies, regulatory filings, news, and social media postings.

The second information may include, for example, any one or more of profile information that relates to one or more persons that are associated with the a company (i.e., leadership profiles), product information that relates to one or more product(s) that are associated with a company, service information that relates to one or more services that are provided by a company, descriptive information that relates to a company description, employee number information that relates to a number of employees associated with (i.e., employed by) a company, and policy information that relates to at least one corporate policy that is associated with a company. The policy information may include, for example, at least one environmental, social, and governance (ESG) policy that is associated with a company.

In an exemplary embodiment, the determination of the set of publicly available data sources may include extracting a company name and/or a company web site from the first information received in step S402. In addition, the determination of the set of publicly available data sources may also include performing a web search based on the company name and/or the company web site and at least one predetermined keyword.

At step S406, the automated public information discovery module 302 receives user input that relates to types of information to be accessed from the publicly accessible data sources. In this aspect, the user may specify which types of information are of greatest interest and/or deemed most relevant for the task at hand. In an exemplary embodiment, the types of information to be accessed may include any one or more of a first data type that relates to a company site, a second data type that relates to a company description, a third data type that relates to a company leadership, a fourth data type that relates to a product associated with a company, a fifth data type that relates to a service provided by a company, a sixth data type that relates to an asset under management associated with a company, a seventh data type that relates to an ESG policy associated with a company, and an eighth data type that relates to an annual report associated with a company.

At step S408, the automated public information discovery module 302 retrieves a subset of the second information from the publicly accessible data sources identified in step S404, based on the inputted data types received in step S406. In an exemplary embodiment, the retrieval of the subset of the second information may be performed by using an artificial intelligence (AI)—based algorithm to extract the subset of the second information from the publicly accessible data sources.

At step S410, the automated public information discovery module 302 outputs a result of the retrieval performed in step S408. In an exemplary embodiment, the outputting of the retrieved information includes displaying an output screen of the GUI that includes the retrieved information.

Manually identifying and extracting relevant public information about a large number of startup companies and investors involves significant amount of labor and is limited by a human's capacity for locating and obtaining the information. To overcome the limitation, a novel cross-cutting capability that leverages recent advances in deep learning, natural language processing and compute power to scrape various public data sources and identify and extract relevant information is disclosed herein.

This novel capability develops a web site data aggregator that mines information from company web sites to extract company descriptions, management team information, industry focus, and other suitable types of company-specific information. In an exemplary embodiment, the first step involved in this process is to crawl the web to find the company web site. In order to search the company web site, the crawler leverages the name of the company and its location as attributes on a search-engine search and extracts the first element/hit that matches these attributes.

Once the company web sites have been obtained, information such as company description, name, roles and biographies about the management team, board members and advisory board is extracted. To do so, the company web sites extracted in the previous step are visited and a search for the queried information is conducted. In an exemplary embodiment, a key component of the methodology is a web site navigation system that automatically navigates through the web site to do so.

In an exemplary embodiment, part of the web site navigation system is a decision making module that analyzes the content on each page to decide whether the queried information is present on the current page. For example, if company descriptions or leadership biographies are queried, the decision making module will analyze the page content to decide whether that information is present on the current page by looking for a combination of keywords. If the current page seems to contain the queried information, the content on the current web page is extracted. The model then extracts the team member names, roles, education, experience and areas of focus from the unstructured extracted text.

If the queried information is deemed absent on the current page, all the links present on the current page are collected and probabilistically ranked to contain the queried information. The link most likely to contain the queried information is selected to be visited next. The selected link is visited by the system and the decision making module again analyzes the content of the new page to determine whether or not the queried information is present. In this manner, the web site navigation system navigates through the company web sites recursively to find the queried information, and stops and extracts the content once the queried information is found. A predetermined maximum depth is used as a cut-off to stop the system from indefinitely navigating the company web site.

The present inventors have developed an artificial intelligence (AI)-based framework that uses Natural Language Processing (NLP) and Machine Learning at its core to discover and extract important corporate data and information such as leadership team, products and services, number of employees, and ESG strategies from various public data sources. The framework is designed to be extendable to cover all types of public data sources, such as, for example, company websites, regulatory filings, annual reports, news and social media, and any other suitable types of sources.

In an exemplary embodiment, an input to this framework is a list of companies with their commonly used names and/or Uniform Resource Locations (URLs) of their company web sites. The outputs of the framework may include extracted company-specific information as described above. In an exemplary embodiment, the framework includes several components: 1) company recognition; 2) web crawling; 3) web extraction; 4) data storage; and 5) web service.

Figure 5:
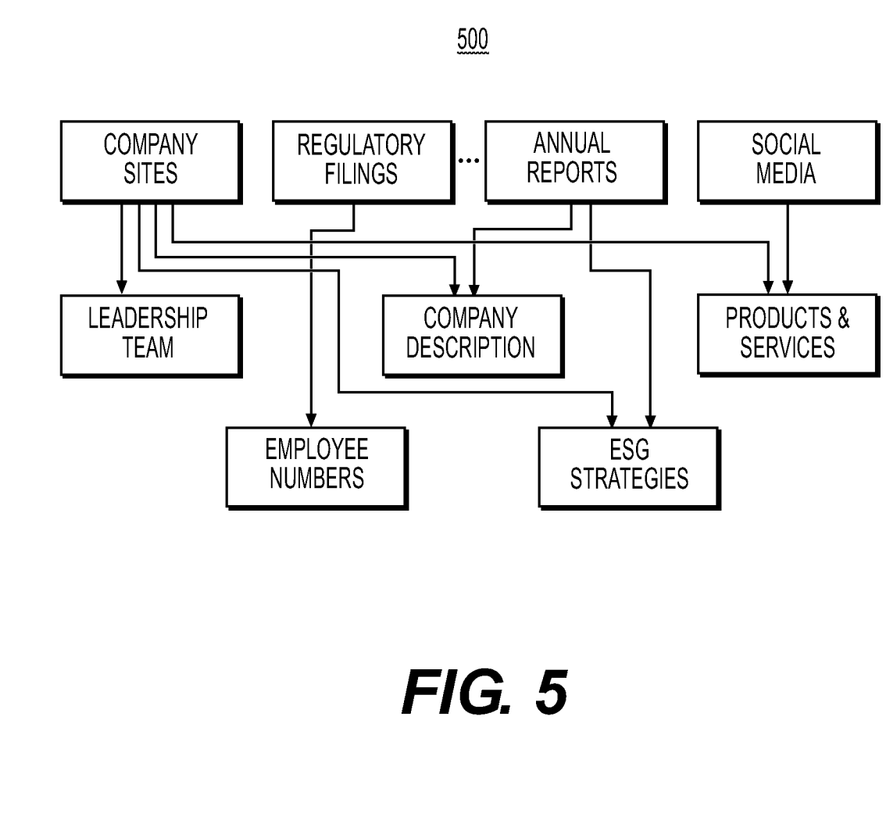
FIG. 5 is a block diagram that illustrates a set of information discovery data sources and tasks for use in a system and method for using an artificial intelligence-based framework to automatically discover and extract information about private and public companies that is accessible from public data sources, according to an exemplary embodiment.

In an exemplary embodiment, the methodology leverages various techniques from natural language processing and text mining technologies, such as, for example, information retrieval, HyperText Markup Language (HTML) parsing, name entity recognition, and information extraction. FIG. 5 is a block diagram 500 that illustrates a set of information discovery data sources and tasks for use in a system and method for using an artificial intelligence-based framework to automatically discover and extract information about private and public companies that is accessible from public data sources, according to an exemplary embodiment.

In an exemplary embodiment, from the standpoint of user experience, the AI-based framework may be used to collect the company-specific data in the manner of self service. With only a few simple steps, users can submit the companies of interest and get extracted results by themselves. 1) First, a user submits a list of company names together with the corresponding web site URLs, for example, in a Microsoft Excel format or a comma-separated values (CSV) file format. 2) The framework then automatically detects the columns of company names and domain names. 3) The user may then select a set of information discovery tasks for data collection. The information discovery tasks may entail a set of data types of interest, such as, for example, company site, company description, company leadership, products and services, asset under management (AUM), environmental, social, and governance (ESG) policies, annual reports, and/or any other suitable type of company-specific data. 4) The framework then indicates the progress of data collection for each company. Once the data and results have been collected from the data sources, they are made available for downloading.

Company Recognition of input data file provided by the users: Identify company name and extract company domains.

Web Crawling based on the tasks: 1) When collecting data from the company web site, run recursive crawling; and 2) when the task entails collecting specific data points, run topic crawling.

Web Extraction based on the tasks: In an exemplary embodiment, the underlying algorithms for different extraction tasks may be implemented separately. This problem may be converted from unstructured data extraction to semi-structured data extraction that uses leveraging of HTML tags. In order to scale web extraction on different sites, one approach is to use a document object model (DOM) tree-based data identification and extraction.

Data Storage: In an exemplary embodiment, the outputs of web crawling are stored in cloud storage and the outputs of web data extraction are formatted as JavaScript Object Notation (JSON) files.

Web Services: In an exemplary embodiment, the web services communicate with the web crawling and web extraction to understand the task progress and load from data storage for the front-end data download requests.

Figure 6:
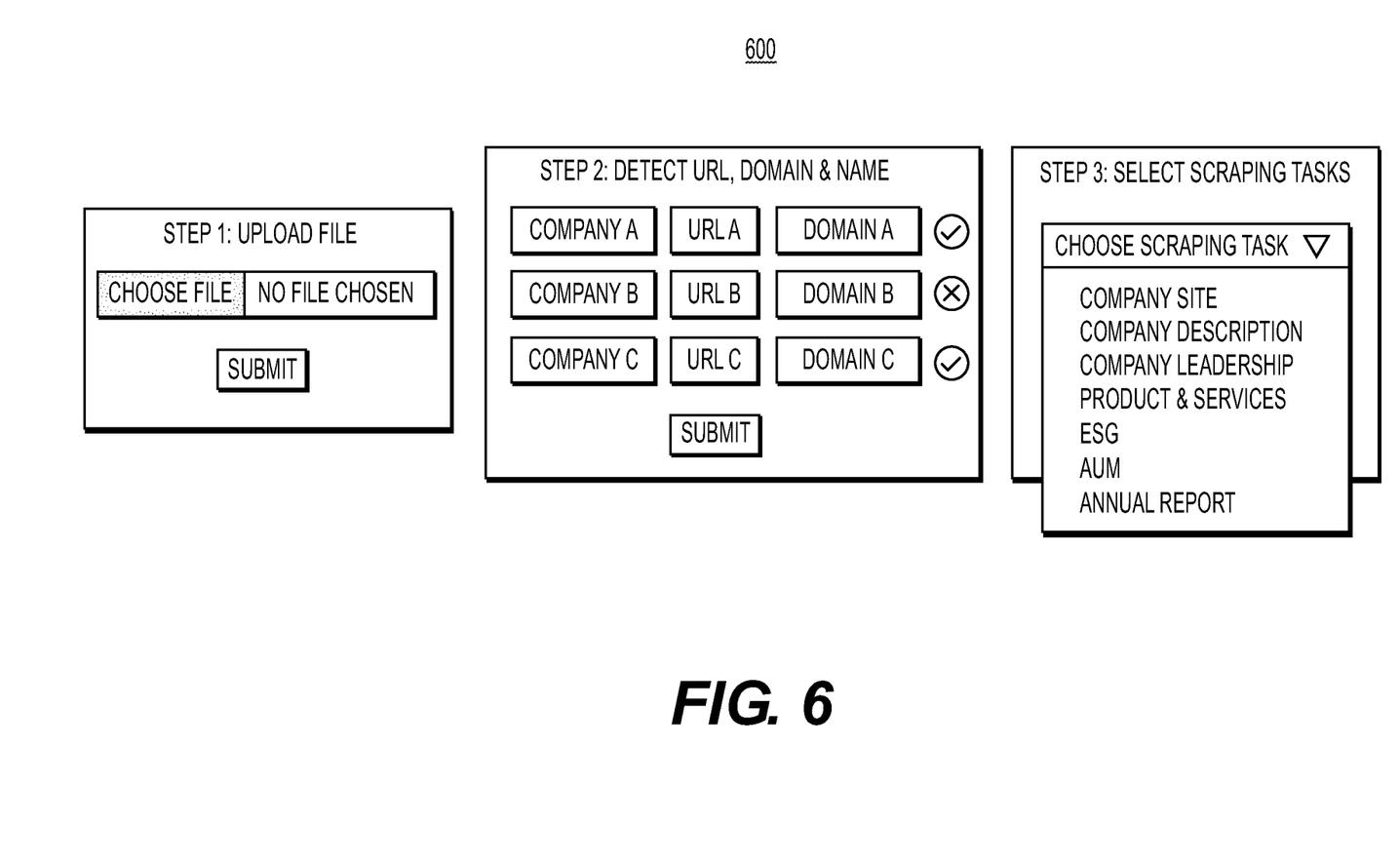
FIG. 6 is an illustration of a front-end design for an input side of a user interface that facilitates entry of user input for executing a method of using an artificial intelligence-based framework to automatically discover and extract information about private and public companies that is accessible from public data sources, according to an exemplary embodiment.
Figure 7:
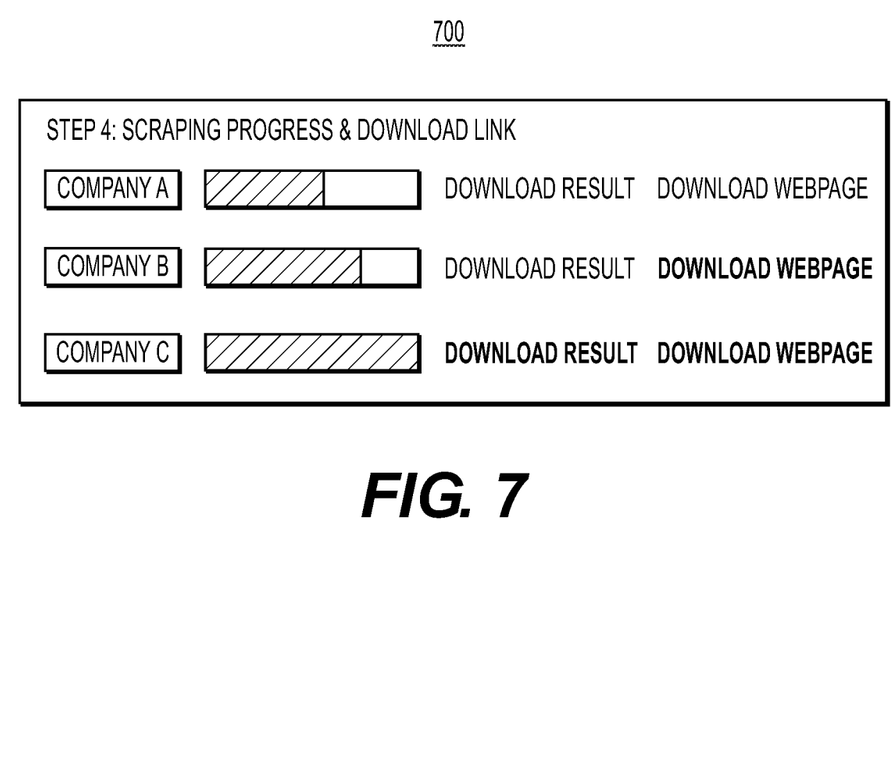
FIG. 7 is an illustration of a front-end design for an output side of a user interface that displays results obtained by executing a method of using an artificial intelligence-based framework to automatically discover and extract information about private and public companies that is accessible from public data sources, according to an exemplary embodiment.

Web User Interface (UI): In an exemplary embodiment, the web UI is designed for non-technical users to execute the information discovery tasks and then collect extracted data points as self-service. An input UI is designed to enable users to upload their lists of companies and then select from list of information discovery tasks. FIG. 6 is an illustration 600 of a front-end design for an input side of such a web UI. An output UI is designed to enable users to download discovery results (either the extracted data or entire set of webpages) for a particular company or for the entire set of companies. FIG. 7 is an illustration 700 of a front-end design for an output side of such a web UI.

Company Recognition: In an exemplary embodiment, for an input file, the company name and company web sites are automatically extracted from the file. When the company web site is not provided by the user, the web site URL is searched online automatically by a search-engine search query.

Web Crawling: In an exemplary embodiment, for topic based crawling, a search-engine query is employed to automatically find the relevant page on the company web site. For this, depending on the task, the company web site and/or the company name is used as a query input, together with pre-selected keywords. These keywords are selected carefully such they maximize the probability of returning the required web page. Once the keywords are selected, the framework provides a customized ranking of the links returned as a result of the search for each of those keywords in order to choose the required page. Then, the web extraction module is used to extract the information queried by the user.

As an example, a task may entail performing ESG information discovery from the web, i.e., to extract articles on company web sites that include information that is relevant to company's environmental, social or governance initiatives. These articles are usually found in the company news pages of the web site.

Keyword Selection: The first step is to find the right page that contains regularly updated information about the ESG policies of the company. This is usually the company news page. To find this page, a large pool of candidate keywords may be used. An example of these keywords may be news, company news, media news, press etc. Based on the large set of keywords, a search-engine query is used to empirically test the keywords that return the correct results. As a result, a smaller but more accurate list of keywords is generated for use in finding the correct web page for the task.

Ranking: Once the query keywords have been selected, those keywords are used to perform a search-engine search with company names and/or company web sites. Each keywords results in a ranked list of pages. In an exemplary embodiment, the ranks are usable as weights for each link.

In an exemplary embodiment, this methodology is usable for identifying a suitable web page that contains the desired information about the company. Each task (e.g., company description, company leadership, ESG) has its own set of keywords that are pre-selected to yield an optimal performance in selecting the web page.

Web Extraction: In an exemplary embodiment, task-specific web extraction modules are included in the framework. Once the web page that contains the required information is identified, the semi-structured representation of data on a web page is leveraged in order to find the most relevant information. Information on a web page is usually present in the form of HTML tags. Naive keywords-based searches on a web page are sub-optimal, as in that process, the knowledge of how a web page is structured is not utilized. Thus, the structure of the web page in incorporated in order to find the exact point in the DOM tree where the required information is present, and then that information is extracted.

Again using the example of an ESG search, one objective is to find news articles present on the web page identified in the previous step. News articles are usually present as links on a web page with a short excerpt. Ideally, it is desirable to find the news link on the web page, go to the news link, and interpret the news link to determine whether or not it is relevant to ESG. In an exemplary embodiment, in order to accomplish this, a node in the DOM tree that is sure to contain a news article is identified. This is done by finding an HTML tag which contains a link, and possibly a short excerpt and a date. In general, news articles are followed by a date, although the date format varies. Accordingly, the framework uses a generalized regular expression (regex) that can identify most representations of dates, and then finds an HTML tag that contains a link, a date and optionally a short excerpt. This HTML tag is the node in the DOM tree that contains the news article links being searched for. Thus, the siblings of this node in the DOM tree are searched in order to extract the list of all news articles.

In general, the process of web extraction includes two steps—identifying a node in the DOM tree that likely contains the queried information, and searching the siblings of that node to extract all of that information on the page. In an exemplary embodiment, the identification of the correct node is done based on heuristics as described above. For ESG news articles, a link and an accompanying date may be used. For leadership information, organizational title, such as, for example, chief executive officer (CEO) or chairman, may be used, together with a picture, a link, and/or a short excerpt. Once a node that likely contains the queried information is identified, the siblings of that node may be searched in order to extract all the task-specific information present on the web page.

Figure 8:
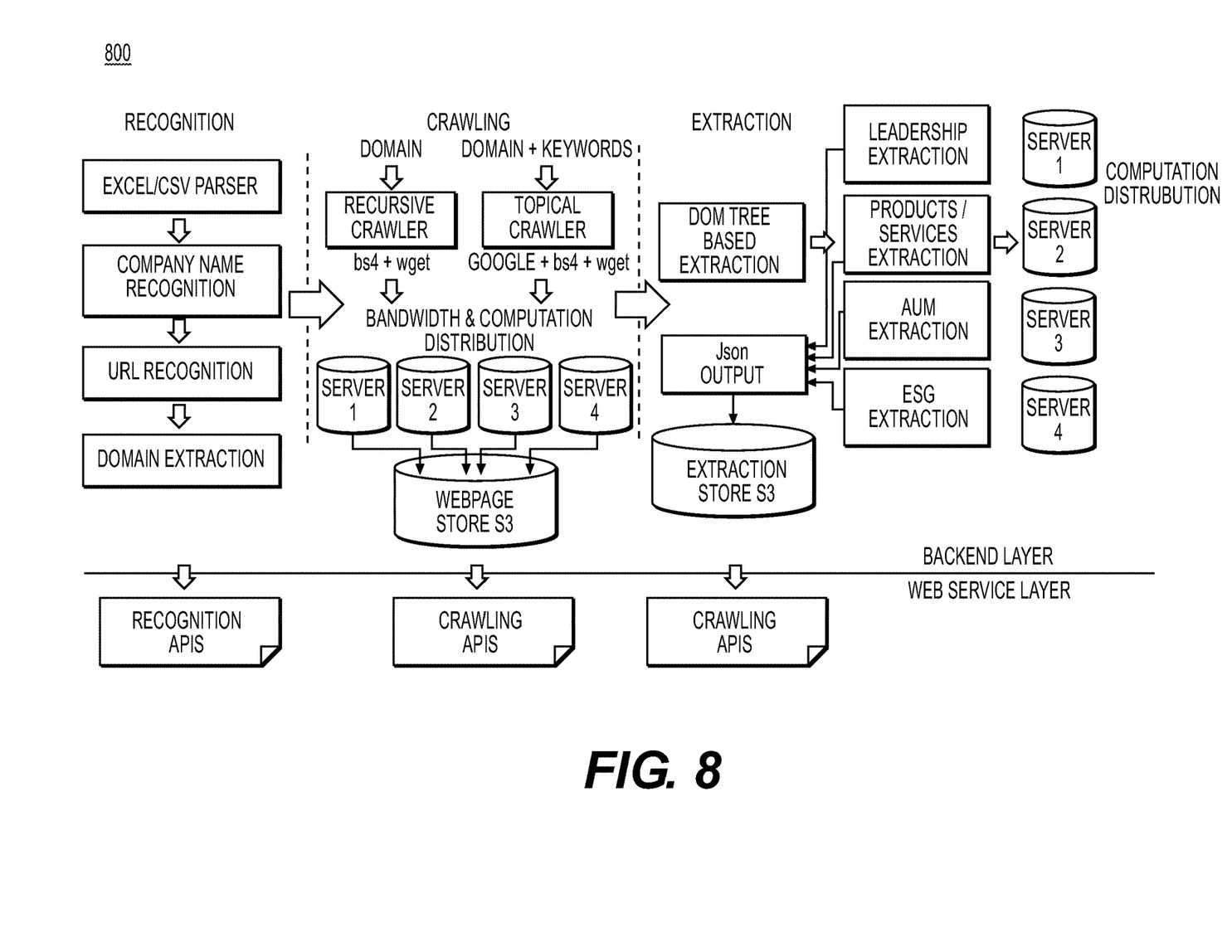
FIG. 8 is a block diagram that illustrates an architecture of a back-end layer and a web service layer of a system for using an artificial intelligence-based framework to automatically discover and extract information about private and public companies that is accessible from public data sources, according to an exemplary embodiment.

FIG. 8 is a block diagram 800 that illustrates an architecture of a back-end layer and a web service layer of a system for using an artificial intelligence-based framework to automatically discover and extract information about private and public companies that is accessible from public data sources, according to an exemplary embodiment. The block diagram 800 demonstrates the system architecture and illustrates 1) how the data flows through the system; 2) how different system components work together; 3) how computation is parallelized and scaled for discovering a large scale companies at the same time; and 4) how a back-end layer, web service layers and front-end layers interact with each other.

Recognition: The system starts by receiving a list of companies from a user. In an exemplary embodiment, the list may be stored as tabular data in an Excel file or a CSV file. The recognition algorithm recognizes the column for company names automatically, then a column of company web site URLs if this data exists in the file. If not, a company web site discovery algorithm may be run to detect company websites based on company names. In addition, a domain extraction algorithm may be run on a web site URL to detect a web site domain. The end-to-end workflow of company recognition may also be invoked by recognition representational state transfer (REST) application programming interfaces (APIs) at a web service layer.

Crawling: After company recognition is completed, referring also to FIG. 6, users may select one or multiple information discovery tasks via the input web UI. In an exemplary embodiment, each information discovery task starts with crawling data from one of the data sources. Depending the selection of the discovery task, the crawler connects with different data sources. For example, when the discovery task relates to a leadership team, then the crawler connects to the company web site. Three types of crawlers may be implemented to fulfill the various information discovery requirements.

Recursive Crawler: In an exemplary embodiment, given a web site URL or a web page URL, crawl everything within the web site or web page and all of the subsequent pages that link thereto but also not beyond a scope and level thereof. The crawler runs recursively until all the subsequent pages are collected.

Topic Crawler: Search web pages within a domain and also containing the topical keywords.

Target Crawler: Collect web pages using defined URLs directly.

In an exemplary embodiment, the result of the crawler is a set of web pages that contain the company information of interest with respect to the discovery task. When the system handles the crawling task with a large scale, then parallelization may be necessary for system scaling. The parallelization of crawling is effective equivalent to parallelization of the network bandwidth. Therefore, the crawling tasks are partly parallelized at the same machine to maximize the bandwidth on a single machine and then distributed to multiple machines of a cluster, depending on the size of clusters.

Extraction: In an exemplary embodiment, after collecting webpages from crawlers, the next step is to use an information extraction algorithm to extract the data points of interest. The extraction algorithm leverages the HTML, tags and the textual content in tags. Therefore, the extraction is a semi-structured extraction algorithm.

Data Storage: In an exemplary embodiment, extraction results are represented in JSON format and are stored in a relationship data storage server.

Web Services: In an exemplary embodiment, the web service layer provides APIs to invoke recognition, crawling and extraction processes. The web service layer also provides REST APIs to access data storage and return the information discovery results.

Accordingly, with this technology, an optimized process for using an artificial intelligence-based framework to automatically discover and extract information about private and public companies that is accessible from public data sources is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for extracting company-specific publicly accessible information, the method being implemented by at least one processor, the method comprising:
   receiving, by the at least one processor, first information that relates to an identification of at least one company;
   determining, by the at least one processor based on the first information, at least one publicly accessible data source via which second information that relates to the at least one company is available;
   receiving, by the at least one processor, at least one user input that relates to a type of company-specific data to be accessed from the at least one publicly accessible data source;
   retrieving, by the at least one processor based on the received at least one user input, a subset of the second information, wherein the retrieving of the subset of the second information comprises mining the at least one publicly accessible data source via a data aggregator and using an artificial intelligence (AI)-based algorithm to extract the subset of the second information from the at least one publicly accessible data source based on the at least one user input, wherein the at least one publicly accessible data source comprises social media; and
   outputting, by the at least one processor, the subset of the second information.

2. The method of claim 1, wherein the second information includes at least one from among profile information that relates to at least one person that is associated with the at least one company, product information that relates to at least one product that is associated with the at least one company, service information that relates to at least one service that is provided by the at least one company, descriptive information that relates to a description of the at least one company, employee number information that relates to a number of employees associated with the at least one company, and policy information that relates to at least one corporate policy that is associated with the at least one company.

3. The method of claim 2, wherein the policy information includes at least one environmental, social, and governance (ESG) policy that is associated with the at least one company.

4. The method of claim 1, wherein the at least one user input that relates to a type of company-specific data includes at least one from among a first data type that relates to a company site, a second data type that relates to a company description, a third data type that relates to a company leadership, a fourth data type that relates to a product associated with the company, a fifth data type that relates to a service provided by the company, a sixth data type that relates to an asset under management associated with the company, a seventh data type that relates to an environmental, social, and governance (ESG) policy associated with the company, and an eighth data type that relates to an annual report associated with the company.

5. The method of claim 1, further comprising displaying an input screen of a graphical user interface that includes at least one prompt for facilitating at least one from among the receiving of the first information and the receiving of the at least one user input.

6. The method of claim 5, further comprising displaying an output screen of the graphical user interface that includes a result of the outputting of the subset of the second information.

7. The method of claim 1, wherein the determining of the at least one publicly accessible data source comprises extracting at least one from among a company name and a company website from the first information.

8. The method of claim 7, wherein the determining of the at least one publicly available data source further comprises performing a web search based on the at least one from among the company name and the company website and at least one predetermined keyword.

9. The method of claim 8, wherein the determining of the at least one publicly available data source further comprises performing a recursive web crawling operation within the company website and at least one web page that links to the company website.

10. The method of claim 8, wherein the determining of the at least one publicly available data source further comprises performing a topic-based web crawling operation within a domain to identify at least one web page that contains the at least one predetermined keyword and to provide a ranking of each of the identified at least one web page.

11. The method of claim 1, wherein the retrieving comprises selecting at least one keyword that maximizes the probability that a keyword search will return the subset of the second information.

12. The method of claim 1, wherein the AI-based algorithm comprises a document object model (DOM) tree-based data identification and extraction algorithm that is configured to identify at least one HyperText Markup Language (HTML) tag that contains a link to a news article that includes at least a portion of the second information.

13. A computing apparatus for extracting company-specific publicly accessible information, the computing apparatus comprising:
    a processor;
    a memory;
    a display; and
    a communication interface coupled to each of the processor, the memory, and the display,
    wherein the processor is configured to:
        receive, via the communication interface, first information that relates to an identification of at least one company;
        determine, based on the first information, at least one publicly accessible data source via which second information that relates to the at least one company is available;
        receive, via the communication interface, at least one user input that relates to a type of company-specific data to be accessed from the at least one publicly accessible data source;
        retrieve, based on the received at least one user input, a subset of the second information, wherein the retrieval of the subset of the second information comprises maximizing a bandwidth of a machine by parallelizing crawling tasks of the machine before distributing the crawling tasks to each of a plurality of machines that belong to a cluster and using an artificial intelligence (AI)—based algorithm to extract the subset of the second information from the at least one publicly accessible data source based on the at least one user input, wherein the at least one publicly accessible data source comprises social media; and
    output the subset of the second information.

14. The computing apparatus of claim 13, wherein the second information includes at least one from among profile information that relates to at least one person that is associated with the at least one company, product information that relates to at least one product that is associated with the at least one company, service information that relates to at least one service that is provided by the at least one company, descriptive information that relates to a description of the at least one company, employee number information that relates to a number of employees associated with the at least one company, and policy information that relates to at least one corporate policy that is associated with the at least one company.

15. The computing apparatus of claim 14, wherein the policy information includes at least one environmental, social, and governance (ESG) policy that is associated with the at least one company.

16. The computing apparatus of claim 13, wherein the at least one user input that relates to a type of company-specific data includes at least one from among a first data type that relates to a company site, a second data type that relates to a company description, a third data type that relates to a company leadership, a fourth data type that relates to a product associated with the company, a fifth data type that relates to a service provided by the company, a sixth data type that relates to an asset under management associated with the company, a seventh data type that relates to an environmental, social, and governance (ESG) policy associated with the company, and an eighth data type that relates to an annual report associated with the company.

17. The computing apparatus of claim 13, wherein the processor is further configured to cause the display to display an input screen of a graphical user interface that includes at least one prompt for facilitating at least one from among the receiving of the first information and the receiving of the at least one user input.

18. The computing apparatus of claim 17, wherein the processor is further configured to cause the display to display an output screen of the graphical user interface that includes a result of the outputting of the subset of the second information.

19. A non-transitory computer readable storage medium storing instructions for extracting company-specific publicly accessible information, the storage medium comprising executable code which, when executed by a processor, causes the processor to:
    receive first information that relates to an identification of at least one company;
    determine, based on the first information, at least one publicly accessible data source via which second information that relates to the at least one company is available;
    receive at least one user input that relates to a type of company-specific data to be accessed from the at least one publicly accessible data source;
    retrieve, based on the received at least one user input, a subset of the second information,
        wherein the retrieval of the subset of the second information comprises mining the at least one publicly accessible data source via a data aggregator, maximizing a bandwidth of a machine by parallelizing crawling tasks of the machine before distributing the crawling tasks to each of a plurality of machines that belong to a cluster, and using an artificial intelligence (AI)-based algorithm to extract the subset of the second information from the at least one publicly accessible data source based on the at least one user input, and
        wherein the at least one publicly accessible data source comprises social media; and
    output the subset of the second information.

20. The storage medium of claim 19, wherein the second information includes at least one from among profile information that relates to at least one person that is associated with the at least one company, product information that relates to at least one product that is associated with the at least one company, service information that relates to at least one service that is provided by the at least one company, descriptive information that relates to a description of the at least one company, employee number information that relates to a number of employees associated with the at least one company, and policy information that relates to at least one corporate policy that is associated with the at least one company.

* * * * *